(12) United States Patent
King

(10) Patent No.: US 6,418,974 B1
(45) Date of Patent: Jul. 16, 2002

(54) WOVEN FABRIC USING THREE DIMENSIONAL AND FLAT WEAVE IN COMBINATION, RELATED METHODS AND FILTER ELEMENT

(75) Inventor: Kevin Nelson King, Alto, GA (US)

(73) Assignee: SI Corporation, Chickamauga, GA (US)

( * ) Notice: Subject to any disclaimer, the term of this patent is extended or adjusted under 35 U.S.C. 154(b) by 0 days.

(21) Appl. No.: 09/760,272

(22) Filed: Jan. 12, 2001

(51) Int. Cl.[7] .................. D03D 23/00; D03D 11/00; B01D 46/02
(52) U.S. Cl. .................. 139/383 R; 139/384 R; 139/DIG. 1; 442/205; 55/341 R
(58) Field of Search .................. 139/383 R, 384 R, 139/420 R, DIG. 1; 442/203, 205; 55/341 R

(56) References Cited

U.S. PATENT DOCUMENTS

| | | | | |
|---|---|---|---|---|
| 2,042,362 | A | 5/1936 | Schilegel | 26/44.5 |
| 3,468,746 | A | 9/1969 | Scheier | 161/63 |
| 3,616,137 | A | 10/1971 | Horton | 161/66 |
| 4,398,931 | A * | 8/1983 | Shevlin | 55/341 R |
| 4,548,850 | A | 10/1985 | Stauder | 428/88 |
| 4,709,443 | A * | 12/1987 | Bigley | 15/339 |
| 5,244,718 | A * | 9/1993 | Taylor et al. | 428/229 |
| 5,567,087 | A | 10/1996 | Theisen | 405/258 |

FOREIGN PATENT DOCUMENTS

| | | |
|---|---|---|
| JP | 0021630 | 2/1982 |
| JP | 402043408 A | 2/1990 |
| JP | 2233115 | 9/1990 |
| JP | 406033437 | 2/1994 |
| SU | 0988918 | 1/1983 |

* cited by examiner

*Primary Examiner*—Amy Vanatta
*Assistant Examiner*—Robert H. Muromoto, Jr.
(74) *Attorney, Agent, or Firm*—Renner, Kenner, Greive, Bobak, Taylor & Weber

(57) ABSTRACT

A woven fabric (10) comprising at least one raveling-prone weave section (12) surrounded by raveling-resistant weave (14) such that said raveling-resistant weave defines the shape of said at least one raveling-prone weave section. A method for creating a woven fabric having a plurality of raveling-prone weave sections, each surrounded by a perimeter of raveling-resistant weave, comprises programming a desired weave pattern into a dobby to weave the raveling-prone weave sections of the fabric in a prescribed pattern and change the weave to that of the raveling-resistant weave when the desired length of those raveling-prone weave sections is reached; drawing warp ends corresponding to the raveling-prone weave sections on harness frames (62) separate from those harness frames associated with warp ends corresponding to the raveling-resistant weave such that the warp ends of the raveling-prone weave sections can be independently raised or lowered by their associated harness frames; weaving fabric according to the prescribed pattern in the dobby; and providing raveling-resistant weave in the warp direction by independently raising and lowering warp ends associated with the raveling-resistant weave.

22 Claims, 6 Drawing Sheets

WOVEN FABRIC USING THREE DIMENSIONAL AND FLAT WEAVE IN COMBINATION, RELATED METHODS AND FILTER ELEMENT

BACKGROUND OF THE INVENTION

The present invention relates generally to woven fabrics and, more particularly, to woven fabrics that comprise at least one section of weave that is prone to raveling when cut, this section being bounded by a perimeter of weave that is less prone to raveling. The weave sections that are less prone to raveling provide areas where the woven fabric can be cut to provide a border area that is less susceptible to raveling than the bounded raveling-prone area.

Three-dimensional (3-D) woven fabrics are commonly used in many various industrial applications. For example, 3-D woven fabrics are used as filters, separators, and moisture coalescing surfaces. The present invention is more particularly directed toward providing an improved woven fabric for use in these and other applications in which 3-D woven fabrics could be advantageously employed.

An inherent problem with 3-D woven fabrics is that their weave patterns are such that they ravel rather easily. When 3-D fabrics are cut into pieces during the fabrication of a useful part for a given application, the cut edges have a high tendency to fray causing the threads of the woven fabric to ravel from the edge. This increased tendency to ravel is due, at least in part, to the structure of the weave pattern within the 3-D fabric. In a 3-D woven fabric, there is not enough yarn or filament mass in the weave pattern to allow for sufficient bonding and sealing of the fabric yarns to prevent fabric fraying.

Current methods employed to prevent fraying include the application of heat to the cut ends of a 3-D woven fabric to thermally bond the yarns in the fabric to one another. Alternatively, or in combination with thermal bonding, the cut edges of a 3-D woven fabric are commonly rigidly affixed within a frame. The frame is employed to grip the multitude of exposed yarns at the cut edge surface and thereby prevent their motion relative to one another in order to prevent the raveling of the fabric. However, a problem in the prior art is that 3-D fabric is difficult to place within a frame because 3-D fabrics tend to ravel when being manipulated in conjunction with placement in these frames. Thus, at the internal perimeter of the frame, the yarns of the 3-D weave may be raveled at the area proximate the frame members such that the utility of the 3-D fabric can be substantially compromised.

Flat weave fabrics tend to resist raveling much better than 3-D fabrics because the yarns of a flat weave fabric are more densely woven than the yarns of a 3-D woven fabric and therefore better able to bond and seal to prevent fabric fraying. Examples of basic flat weaves include plain, satin, and twill weaves. It is generally known that most flat weave fabrics have the ability to retain sufficiently sealed edges when cut. Additionally, flat weave fabrics do not tend to ravel within frames as do 3-D woven fabrics. Thus, it has been discovered, and is herein disclosed, that the shortcomings discussed hereinabove with respect to 3-D fabric can be substantially overcome by providing a woven fabric having 3-D weave sections bounded by flat weave sections.

It should be appreciated, however, that 3-D fabrics are not the only fabrics that contain weave patterns susceptible to raveling when cut. Indeed, even some weave patterns that would normally be considered flat weave exhibit a tendency to ravel when cut. Accordingly, while the focus of the best mode for carrying out the present invention is on employing 3-D weave and flat weave in combination, it should be understood that the teachings herein can readily be adapted and applied to provide, more generally, a woven fabric using in combination, a weave having a tendency to ravel when cut (herein termed a "raveling-prone weave") and a weave that tends to resist raveling when cut (herein termed a "raveling-resistant weave"). Non-limiting examples of raveling-prone weaves include honeycomb weave, diamond weave, basket weave, and various rib weaves.

As is generally known, most woven fabrics are manufactured on large width looms, on the order of 12 feet or so across. For various applications, the fabrics may be cut, such as for instance, to length, as well as into shorter widths. For some weave patterns, the cut ends will ravel unless subsequently treated or bound. By weaving a raveling-resistant weave section around other sections having raveling-prone weaves, fabrics according to the present invention can be provided where raveling and post-weave operations are substantially reduced if not eliminated altogether.

Thus, there exists a need in the art for a woven fabric providing woven sections prone to raveling when cut in combination with woven sections that are raveling-resistant, such that the fabric can be employed in industrial applications requiring the raveling fabric, (e.g. 3-D woven fabric), and yet still prevent raveling and be able to remain whole when placed in a frame.

SUMMARY OF INVENTION

In light of the foregoing, it is an object of the present invention to provide a woven fabric using a raveling-resistant weave in combination with a raveling-prone weave.

It is also an object of the present invention to provide a woven fabric, as above, having at least one raveling-prone weave section that is completely bounded by a raveling-resistant weave such that the raveling-resistant weave defines the shape of the at least one raveling-prone weave section.

It is yet another object of the present invention to provide a woven fabric, as above, wherein the raveling-resistant weave can be cut with a hot knife, laser, ultrasonic, or other similar cutting device and still substantially resist raveling at the cut edges.

It is another object of the present invention to provide a woven fabric, as above, wherein the cut edges of the raveling-resistant weave can be placed within a frame and resist raveling proximate to the frame members.

It is an object of the present invention to provide a woven fabric, as above, in which the raveling-resistant weave is flat weave and the at least one raveling-prone weave section is a 3-D weave section.

It is still yet a further object of the present invention to provide a woven fabric, as above, wherein the yarns of the at least one 3-D weave section are woven in a honeycomb, diamond, or double cloth, pattern.

It is an object of the present invention to provide a woven fabric, as above, wherein the yarns of the flat weave sections are woven in a plain, twill, or satin pattern.

Yet another object of the present invention is to provide a filter element comprising a frame carrying a combination woven fabric as set forth herein.

Additionally, it is an object of the present invention to provide a method for the production of a woven fabric exhibiting one or more of the aspects of the present invention as outlined above.

At least one or more of these objects of the present invention, as well as the advantages thereof over existing prior art forms, which will become apparent from the description to follow, are accomplished by the improvements herein described and claimed.

In general, a woven fabric made in accordance with the present invention includes at least one raveling-prone weave section bounded by raveling-resistant weave to define the shape of the raveling-prone weave section.

Other aspects of the present invention are accomplished by a method for creating a woven fabric having a plurality of raveling-prone weave sections, each surrounded by a perimeter of raveling-resistant weave, comprising programming a desired weave pattern into a dobby to weave the raveling-prone weave sections of the fabric in a prescribed pattern and change the weave to that of the raveling-resistant weave when the desired length of those raveling-prone weave sections is reached; drawing warp ends corresponding to the raveling-prone weave sections on harness frames separate from those harness frames associated with warp ends corresponding to the raveling-resistant weave such that the warp ends of the raveling-prone weave sections can be independently raised or lowered by their associated harness frames; weaving fabric according to the prescribed pattern in the dobby; and providing raveling-resistant weave in the warp direction by independently raising and lowering warp ends associated with the raveling-resistant weave.

Finally, the present invention provides a filter element comprising a frame member; and a woven fabric providing at least one raveling-prone weave section surrounded by raveling-resistant weave such that the raveling-resistant weave defines the shape of the at least one raveling-prone weave section

BRIEF DESCRIPTION OF THE DRAWINGS

Preferred exemplary woven fabrics incorporating the concepts of the present invention are shown by way of example in the accompanying drawings without attempting to show all of the various forms and modifications in which the invention might be embodied, the invention being measured by the appended claims and not by the details of the specification.

PREFERRED EMBODIMENT FOR CARRYING OUT THE INVENTION

Figure 1:
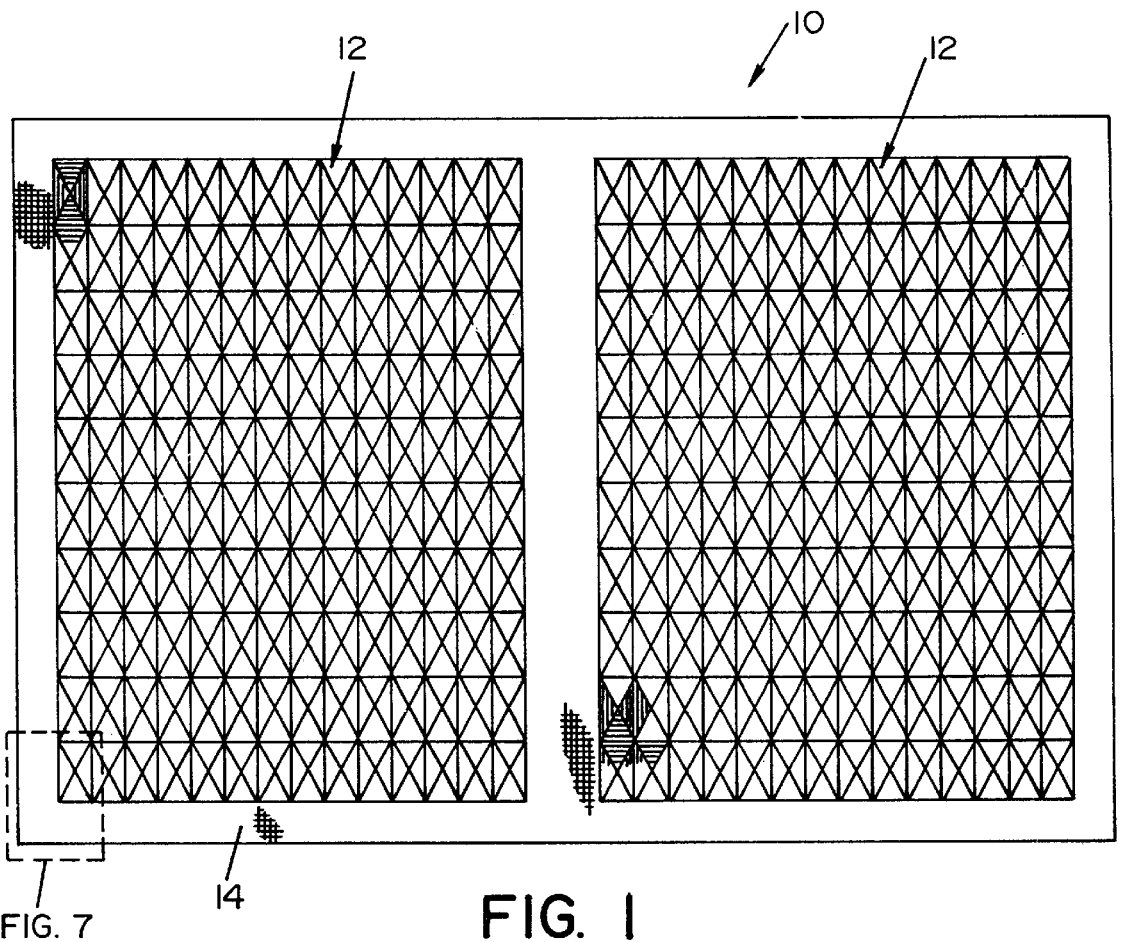
FIG. 1 is front plan view of a woven fabric made in accordance with one embodiment of the present invention.

With reference to FIG. 1, it can be seen that the woven fabric of the present invention is designated generally by the numeral 10. Woven fabric 10 includes at least one raveling-prone weave section 12 that is bounded by a raveling-resistant weave 14. In the woven fabric 10 of FIG. 1, two raveling-prone weave sections 12 are shown; however, it should be appreciated that a woven fabric 10 made in accordance with the present invention could have any number of raveling-prone weave sections 12, each raveling-prone weave section 12 being surrounded by raveling-resistant weave 14 such that the raveling-resistant weave 14 defines the shape of each of the raveling-prone weave sections 12.

Generally, the fabric of the present invention is designed to utilize large areas or segments of raveling-prone weave 12 and thus, the surrounding raveling-resistant weave 14 provides a border of from about 0.5 to about 4 inches (12.5–100 mm), in order to provide an adequate area for cutting between raveling-prone weave sections. However, for other purposes, it is within the present invention to provide much greater borders of raveling-resistant weave sections, on the order of from about 2 to about 8 inches (5–20 cm). Stated another way, the preferred fabric 10 provides a major area of raveling-prone weave sections, on the order of about 80 percent, although lesser areas of about 50 percent are possible and finally, it is within the scope of the present invention to provide raveling-resistant areas of fabric that exceed the combined area of raveling-prone sections. In other words, fabrics having from about one to about 99 percent raveling-prone area can be manufactured according to the present invention as well as fabrics having from about one to about 99 percent raveling-resistant area.

By raveling-prone weave it is meant that the weave or knit of the fabric is prone to becoming separated or, in other words, is prone to raveling. It should be understood that the concepts of the present invention can be advantageously applied to any raveling-prone weave type, although the focus of the present invention is particularly on 3-D weave.

It should be appreciated that woven fabric 10 is of unitary construction, that is, the warp and weft yarns that are woven to create raveling-prone weave sections 12 also make up a raveling-resistant weave 14. Indeed, in a process according to the present invention, raveling-prone weave section 12 and raveling-resistant weave 14 are created at the same time on a single loom.

Raveling-prone weave sections 12 are not limited to any particular weave pattern inasmuch as the tendency of a fabric to ravel when cut is determined by many parameters, including, but not limited to, the weave pattern itself. Non-limiting examples of some other parameters include the following: the type of yarn in the warp and fill direction; the yarn composition; and the density of the yarn in the warp and fill direction. While it would be impossible to describe every possible combination of the above parameters and their relationship to the stability of a woven fabric, (i.e. its tendency to ravel), a brief discussion of each parameter should aid those of ordinary skill in the art in appreciating the scope of the present invention.

There are four major categories of yarns commonly available in the textile industry from which fabrics are woven. These yarns include: spun yarn, continuous multi-filament yarn, tape yarn, and monofilament yarn. Characteristics of these yarns should be readily appreciated by those of ordinary skill in the art; however, a brief description of each of these yarns is provided.

Spun yarn is yarn produced by twisting short staple fibers together. Continuous multi-filament yarn is yarn produced by extruding a polymer into a bundle of fibers, each with a relatively small cross-sectional area but continuous in length. Tape yarn is yarn extruded from a polymer into a single strand, typically in a rectangular cross-sectional shape, with the width of the tape usually being much greater than the thickness of the tape. Monofilament yarn is yarn extruded from a polymer into a single strand, and, although most commonly round, these yarns may be extruded in a variety of cross-sectional shapes. Typically, with all other factors being equal, a fabric constructed from a monofilament yarn will have less tendency to ravel when cut than similarly constructed fabrics woven with other types of yarns because a monofilament yarn has substantially more stiffness and tends to retain its shape when woven into a fabric. Thus, monofilament yarns are preferred in the present invention because of their tendency to return their original fixed position in a fabric.

Yarn composition refers to the type of material from which the yarn is produced. It is different from the type of yarn referred to above in that the type of yarn refers to the shape or structure of the yarn. The yarn composition is the basic type of material from which the yarn is produced. Typically, textiles are produced from either natural or synthetic yarns. Spun yarns, for example can be produced from either natural or synthetic staple fiber. An example of a natural fiber is cotton. Synthetic fibers include, as examples, polypropylene, nylon, and polyester. Spun yarns are most often produced from natural fibers, while continuous multifilament yarns, tape yarns, and monofilament yarns are typically produced from synthetic polymers such as polyethylene, polypropylene, nylon, polyester, and array of many other types of synthetic polymers. The advantage of using fabrics woven from yarns of synthetic materials is that edges of these fabrics can be sealed with heat sealing equipment. Cotton fabrics, for example, are not readily sealed in this manner as cotton will burn rather than melt and seal. In the present invention, synthetic yarns are preferably employed because of their chemical and physical properties.

As known in the art, a woven fabric has two principle directions—warp and fill. The warp direction is the length wise, or machine direction of the fabric. The fill direction is the direction across the fabric, from edge to edge, or the direction traversing the width of the weaving machine. Thus, the warp and fill directions are perpendicular to each other. The set of yarns or threads running in each direction are referred to as the warp yarns and the fill yarns, respectively. Fill yarns may also be referred to as picks. The density of yarns in the warp and fill direction also bears on the tendency of a fabric to ravel when cut.

A woven fabric can be produced with varying densities. This is usually specified in terms of number of the ends per inch in each direction, warp and fill. The higher this value is, the more ends there are per inch and, thus, the fabric density is greater or higher. As is generally known in the art, the higher the fabric density, the less tendency there is for the fabric to ravel when cut.

Although yarn density is not the only parameter that contributes to the raveling characteristics of a woven fabric, as a general, non-limiting rule, yarn densities on the order of about 20 to about 100 ends/inch tend to provide raveling-resistant fabrics, while thread densities of less than about 20 ends/inch tend to provide raveling-prone fabrics.

As mentioned hereinabove, the weave pattern is another parameter of fabric construction that affects the tendency of the fabric to ravel when cut. The weave pattern is the pattern in which the warp yarns are interlaced with the fill yarns. A woven fabric is characterized by an interlacing of these yarns. There are literally hundreds of variations of weave patterns commonly used in the textile industry, and those of ordinary skill in the art are familiar with most of the basic patterns. While it is beyond the scope of the present application to include a disclosure of these multitude of weave patterns, the basic plain, twill, and satin weave patterns, as well as the common honeycomb weave, will be discussed hereinbelow, and it should be understood that those of ordinary skill in the art will readily be able to determine how a given weave pattern could be employed in practicing the present invention in light of the parameters herein disclosed.

Plain weave is the tightest weave possible, with the highest number of interlacings that can be achieved in a woven fabric of a given construction. It is characterized by a repeating pattern where each warp yarn is woven over one fill yarn and then woven under the next fill yarn.

A twill weave, relative to the plain weave, has fewer interlacings in a given area. A twill is a basic type of weave, and there are a multitude of different twill weaves. A twill weave is named by the number of picks which a single warp thread goes over and then under. For example, in a 2/2 twill weave, a single warp end weaves over two fill yarns and then under two fill yarns. In a 3/1 twill weave, a single warp end weaves over three fill yarns and then under one fill yarn. For fabrics being constructed from the same type and size of yarn, with the same thread densities, a twill weave has fewer interlacings per area than a corresponding plain weave fabric. Therefore, an equally constructed twill weave fabric will have greater tendency to ravel when cut than a corresponding plain weave fabric.

A satin weave, relative to the twill and plain weaves, has fewer interlacings in a given area. It is another basic type of weave from which a wide array of variations can be produced. A satin weave is named by the number of ends on which the weave pattern repeats. For example, a five harness satin weave repeats on five ends and a single warp yarn floats over four fill yarns and goes under one fill yarn. An eight harness satin weave repeats on eight ends and a single warp yarn floats over seven fill yarns and passes under one fill yarn. For fabrics being constructed from the same type of yarns with the same yarn densities, a satin weave has fewer interlacings than either a corresponding plain or twill weave fabric. Therefore, a satin weave would have a greater tendency to ravel when the edges are cut than a corresponding twill or plain weave fabric.

Three-dimensional weave patterns are also known. These weave patterns include honeycomb, diamond, double cloth, crepe, and huckaback. By way of example, a honeycomb weave pattern is disclosed in Theisen U.S. Pat. No. 5,567,087, the entire disclosure which is incorporated herein by reference. The fabrics disclosed therein employ monofilament yarns with heat shrinkage characteristics, and it should be understood that the teachings therein regarding heat shrinkable monofilament yarns can be adapted and applied to the present invention.

In light of the discussion hereinabove relating to the parameters of fabric construction that affect the tendency of a fabric to ravel when cut, it should be readily appreciated that raveling-prone weave sections 12 and raveling-resistant weave 14 should not be limited to any particular weave pattern. Those of ordinary skill in the art may employ a multitude of various weave patterns to practice the teachings of the present invention and provide a woven fabric using raveling-prone weave and raveling-resistant weave in combination.

In a preferred embodiment of the present invention, raveling-prone weave sections 12 are 3-D weave sections.

While raveling-prone weave sections 12 are preferably 3-D weave sections, it should be understood that raveling-prone weave sections 12 are not limited to any particular 3-D weave pattern inasmuch as different patterns will be useful for different applications. Three dimensional weave patterns useful in the present invention include, but are not limited to, honeycomb, diamond, double cloth, crepe, and huckaback weaves. A honeycomb weave is preferred for most air filtration applications because it has a greater fabric/yarn surface area on which particles can be trapped. A double cloth weave is preferred for other various filtration applications because a primary filler cloth can be woven on one side of the fabric with a supporting cloth on the backside of the fabric. An exemplary honeycomb weave pattern has been disclosed hereinabove.

It should be appreciated that the 3-D honeycomb weave discussed hereinabove above is an exemplary weave that is specifically disclosed in order to teach the best mode that is currently known to the inventor for practicing the invention. Therefore, the present invention should not be limited thereto or thereby, and should not be limited to any particular or general 3-D weave pattern. Indeed, as clearly set forth above, the present invention does not require the use of a 3-D pattern, but rather requires only a raveling-prone weave pattern.

Figure 2:
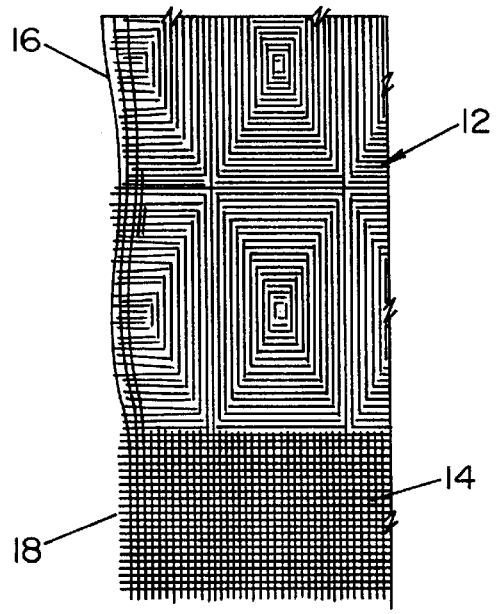
FIG. 2 is an exploded view of a portion of a woven fabric made in accordance with the present invention.

As mentioned hereinabove, due to the structure of their weave pattern, 3-D woven fabrics have a tendency to fray and ravel at a cut edge. This raveling is shown in FIG. 2 at numeral 16. The weave pattern of flat weave fabric, on the other hand, generally has the ability to provide sufficiently sealed edges when cut. This characteristic of flat weave fabrics is shown in FIG. 2 at numeral 18. Thus, in a particularly preferred embodiment of the present invention, 3-D weave sections or, more generally, raveling-prone weave sections 12 are bounded by flat weave 14 or, more generally, raveling-resistant weave 14 to provide a composite woven fabric 10 wherein the individual raveling-prone sections 12 can be separated from the remainder of woven fabric 10 by cutting along the raveling-resistant weave 14 such that the raveling-prone weave section 12 that is cut from the woven fabric 10 possesses cut edges that are sufficiently sealed to prevent raveling of the fabric. The raveling-resistant weave 14 may be cut by conventional means such as a hot knife, laser, ultrasonic, or other similar cutting device or method. Cutting methods employing a heat sealing effect, such as hot knife, laser, ultrasonics, or heated die methods are preferably employed because they help to ensure the creation of a superior sealed edge.

Figure 3:
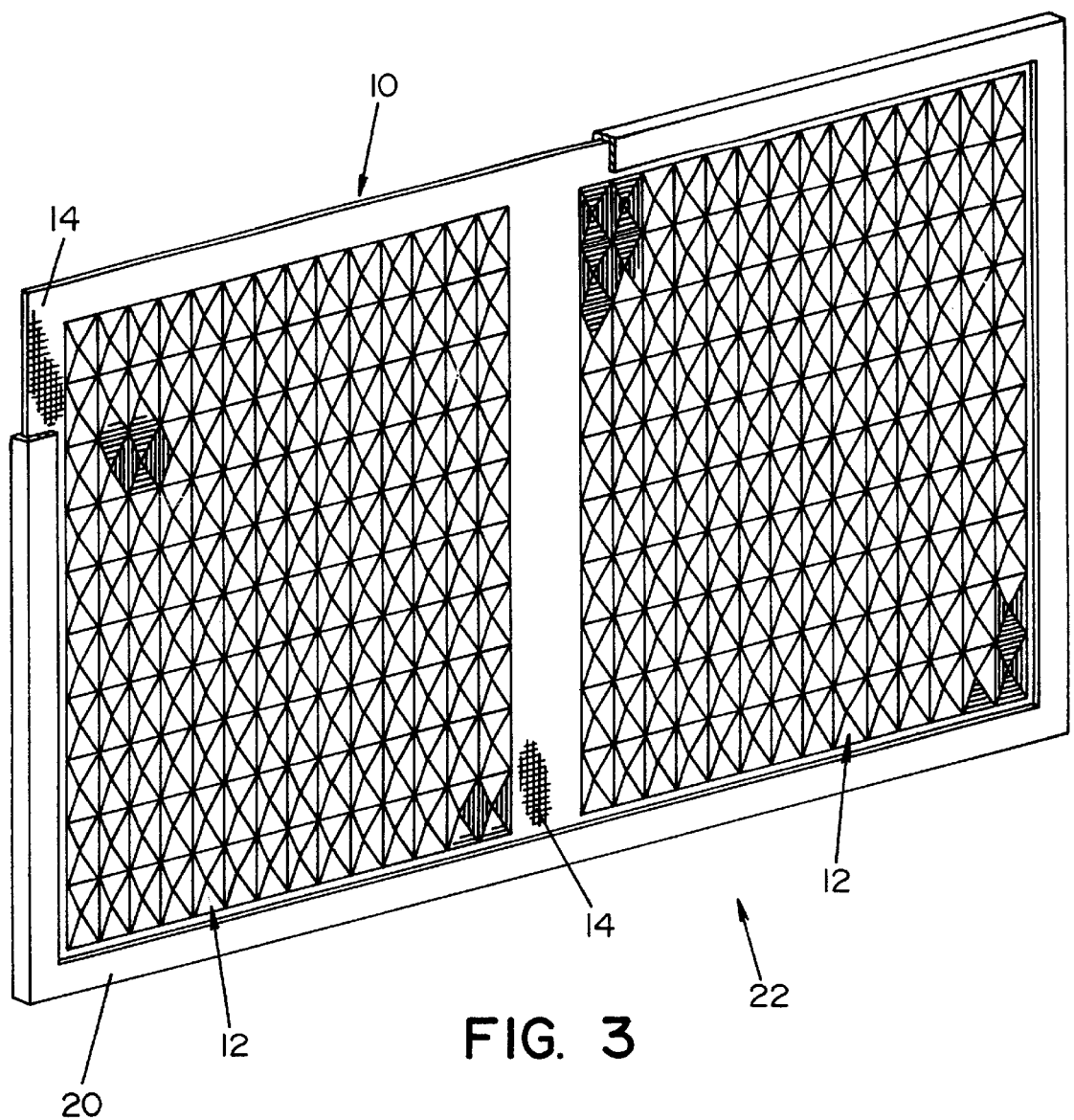
FIG. 3 is a perspective view of a woven fabric made in accordance with the present invention being retained within a frame for use in various applications.

With reference now to FIG. 3, it can be seen that woven fabric 10 having a border of raveling-resistant weave 14, can be placed within a frame 20 to provide an article 22, for a given application such as filtration. The frame can be manufactured from any material e.g. metal, plastic and the like, suitable for the application. Generally the frame is employed to provide rigidity to the woven fabric, as in the instance of filter usage, allowing for placement and removal of the filter from its position within a larger unit such as a HVAC unit or other appliance.

Figure 4:
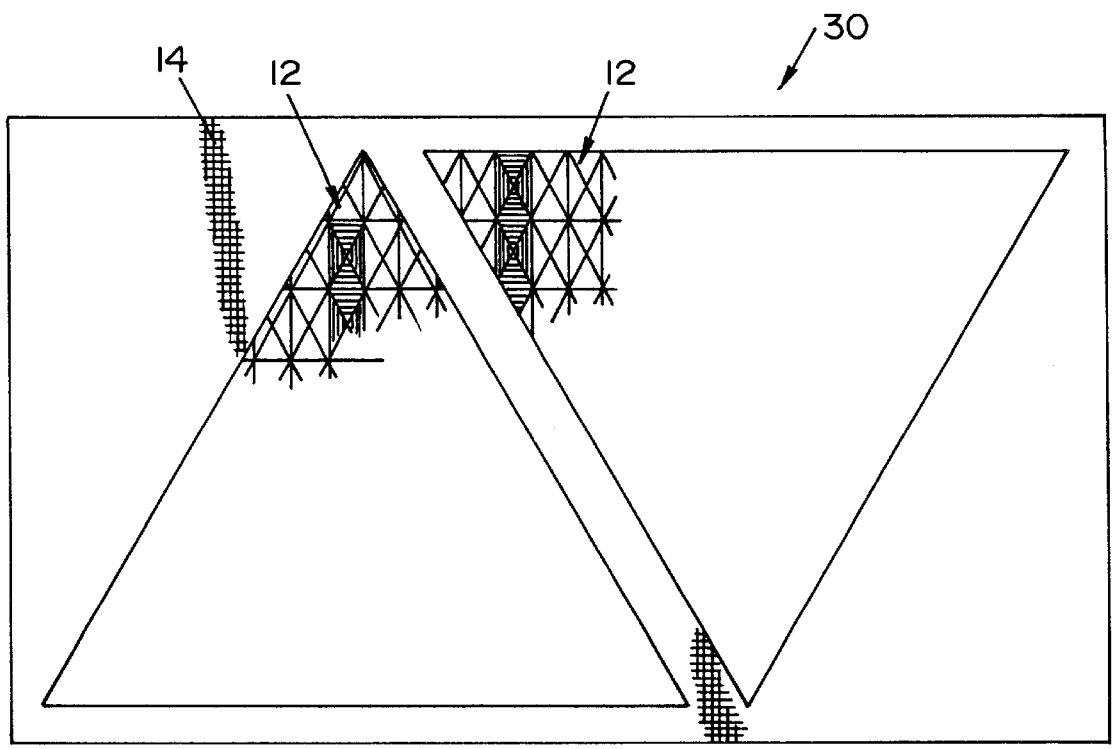
FIG. 4 is a front plan view of an alternative embodiment of the present invention having triangular shaped 3-D weave sections.
Figure 5:
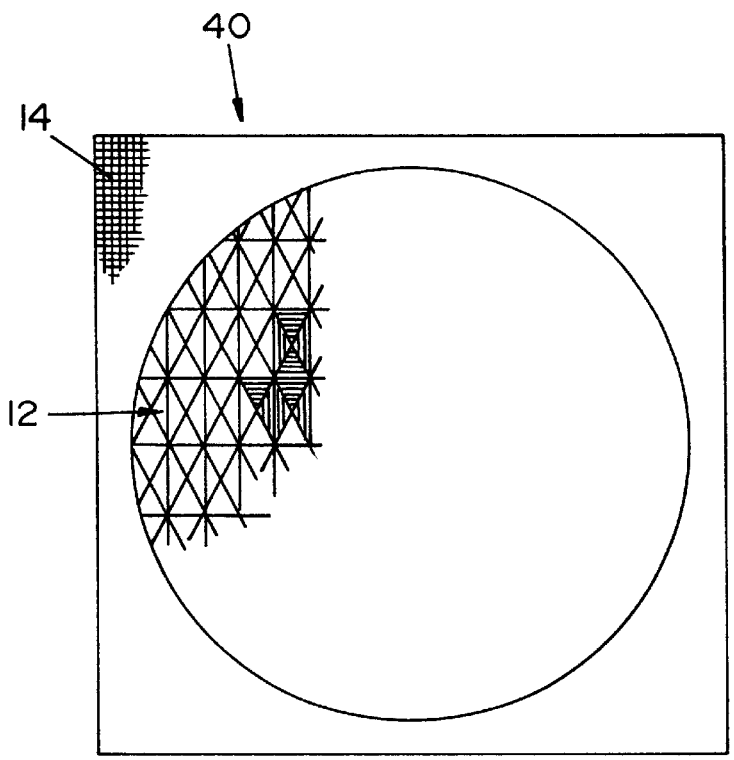
FIG. 5 is front plan view of another alternative embodiment of the present invention showing a circular shaped 3-D weave section.

In FIGS. 1 and 3, woven fabric 10 and, particularly, raveling-prone weave section 12 are shown as being rectangular in shape; however, it should be understood that raveling-prone weave sections 12 can be any shape provided that the weaving machine upon which the woven fabric 10 is created is programed correctly. For example, in FIG. 4, it can be seen that a woven fabric 30 may be provided with triangular raveling-prone weave sections 12. In FIG. 5, a woven fabric 40 is shown having a substantially circular raveling-prone weave section 12. Of course, in the woven fabric 30 of FIG. 4 and the woven fabric 40 of FIG. 5, the alternatively shaped raveling-prone weave sections 12 are still bounded by raveling-resistant weave 14.

As mentioned above, the present invention is a woven structure produced on a weaving machine, or loom. A woven fabric has two distinct directions—warp and fill. These terms are used also to describe the set of yarns which run in each of those directions—warp yarns and fill yarns. The warp yarns run in the lengthwise or machine direction on the weaving machine. The fill yarns run perpendicular to the warp yarns, across the width of the fabric from one side of the weaving machine to the other. A single warp yarn is referred to as an end or warp end, and a single fill yarn is usually referred to as a filling yarn or pick. To produce a woven fabric product, the warp and fill yarns are interlaced at right angles, in a prescribed manner commonly termed the weave pattern.

Figure 6:
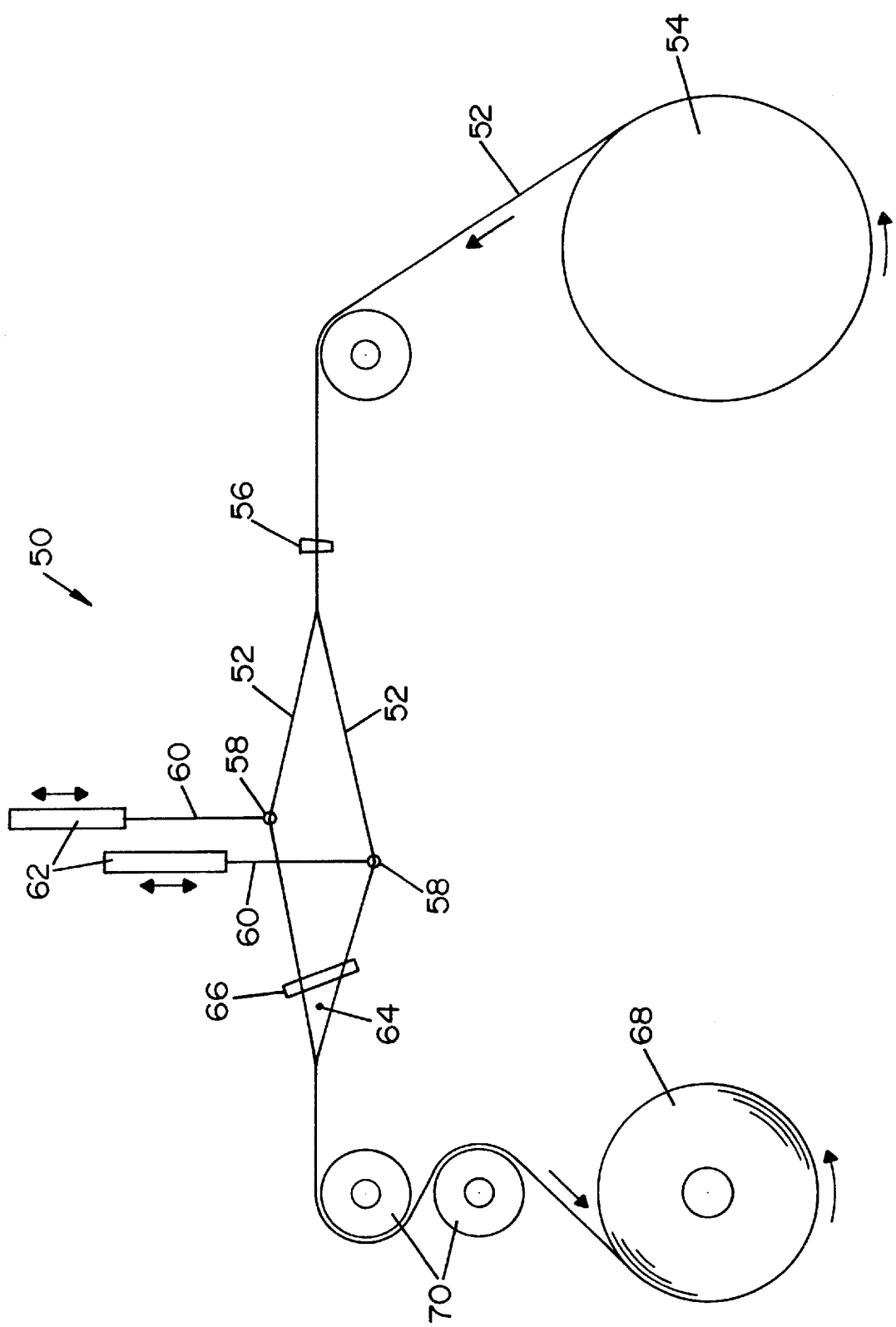
FIG. 6 is a schematic representation of a loom for weaving woven fabric according to the present invention.

In FIG. 6, a traditional dobby weaving machine 50 is schematically represented to assist the disclosure of a method for producing a woven fabric having raveling-prone and raveling-resistant weave construction according to the present invention. More particularly, a dobby weaving machine 50 is employed when raveling-resistant weave 14 is to run parallel to the warp and fill directions such that rectangular raveling-prone weave sections 12 are provided. When raveling-prone weave sections 12 are to be shaped otherwise (i.e. raveling-resistant weave 14 does not run parallel to either the warp or fill direction or both), as shown in FIGS. 4 and 5, a different type of weaving machine is employed. Below, a method for weaving on a dobby weaving machine 50 is first provided. This method is employed when raveling-resistant weave is to run parallel to the warp and fill directions. Thereafter, a method for weaving on a jacquard weaving machine is provided. The jacquard method is employed when raveling-resistant weave is to run in at least one direction that is not parallel to either the warp or fill direction.

With reference to dobby weaving machine 50, in FIG. 6, it can be seen that a plurality of warp yarns or ends 52 are held on warp beam 54. The number of warp ends 52 on warp beam 54 is governed by the desired finished construction of the woven fabric, i.e. the denser the desired construction of the fabric the more warp ends 52 must be present in warp beam 54. Each individual warp end 52 is then drawn through three separate devices on dobby weaving machine 50, each with a given function with respect to the weaving process.

First, each warp end 52 is drawn through an associated drop wire 56. The purpose of drop wire 56 is to stop the weaving machine 50 from operating if any individual warp end 52 breaks, so that the resulting defect in the woven fabric being produced can be repaired by an operator. When each warp end 52 is properly drawn through a drop wire 56, drop wire 56 is in a "raised" position across an electrode bar (not shown) but is not in physical contact with the electrode bar. When a warp end 52 breaks, drop wire 56 makes physical contact with the electrode bar and causes dobby weaving machine 50 to stop so that the broken warp end 52 can be repaired.

Next, each warp end 52 is drawn through a heddle eye 58, which is located in an associated heddle 60 held by an associated harness frame 62. Heddles 60 are metal strips with an eye 58 located in the center. Harness frame 62 holds all heddles 60 in position. As is generally known in the art, each harness frame 62 is programmed through the dobby to raise and lower in a given pattern. The number of harness frames 62 on a dobby weaving machine 50 varies, but the minimum number required on any dobby weaving machine 50 is two. Conventional dobby weaving machines have capacity for up to 30 harness frames.

The function of harness frames 62 is to produce the shed of the fabric by raising and lowering individual warp ends 52 so that an individual strand of filling yarn or pick 64 can be passed across the width of the woven fabric being produced. As those of ordinary skill in the art will readily appreciate, the "shed" of the fabric is the term used for the path running through and perpendicular to the warp direction of the loom and formed by raising some harnesses and associated warp ends while other harnesses and warp ends are left down. The weave pattern of the woven fabric produced is governed by the sequence in which harness frames 62 are raised and lowered as well as by the sequence by which each warp end 52 is drawn through the heddle eye 58 of an associated heddle 60 held by a harness frame 62.

Lastly, each warp end 52 is drawn through reed 66. Reed 66 is a device similar to a comb, with individual openings, called dents (not shown), separated by thin wires (not shown). Warp ends 52 are drawn through the dents keeping each warp end 52 separate from other warp ends 52, and reed 66 beats pick 64 into the proper position on the fabric.

In the weaving operation, the shed of the fabric is opened by the raising and lowering of harness frames 62 according to the pattern programed in the dobby. A single pick 64 is passed through the shed, across the fabric width, by a shuttle or other similar fill yarn carrying device (not shown). Pick 64 is then beat into the woven fabric by reed 66, and the take up device 68 of dobby weaving machine 50 advances the fabric so the next shed can be formed. Harness frames 62 are then crossed in the prescribed manner for the desired weave pattern, and the cycle is repeated. Ultimately, take up device 68 advances the fabric through press rolls 70 and collects the finished fabric.

The production of woven fabric 10 of the present invention requires that two specific procedures be employed on dobby weaving machine 50 in order to achieve the desired effect of providing raveling-resistant weave 14 surrounding each raveling-prone weave section 12. As has been earlier stated in the present invention disclosure, the invention herein is characterized by raveling-resistant weave 14 surrounding and defining the shape of each raveling-prone weave section 12. The width and/or shape of raveling-resistant weave 14 can be varied as required by a given application or end use. The manner in which the raveling-resistant weave 14 is produced in each direction is different and discussed individually hereinbelow.

To produce those portions of raveling-resistant weave section 14 that run in the warp direction, warp ends 52 are drawn into heddle eyes 58 in harness frames 62, which are raised and lowered in a prescribed manner to produce the desired weave pattern. Those warp ends 52 that form raveling-prone weave section 12 or, in accordance with the best mode of the present invention, the 3-D weave section, are woven into a raveling-prone or 3-D pattern resulting in an area that is thicker than the surrounding raveling-resistant weave 14. These warp ends 52 are drawn on one set of harnesses 60 separately from those warp ends 52 that comprise the areas of raveling-resistant weave 14. Thus, those warp ends 52 comprising raveling-resistant weave 14 must be drawn on separate harness frames 62. This results from the fact that raveling-resistant weave 14 is formed in a tighter weave than the raveling-prone weave section or sections 12 it surrounds.

The areas of raveling-resistant weave 14 have a greater number of interlacings of warp and fill yarns (i.e. warp ends 52 and picks 64) than raveling-prone weave sections 12 and, as a result, require more raising and lowering of harness frames 62. Therefore, the warp ends 52 that form the raveling-resistant weave 14 must be drawn on separate harness frames 62 from those harness frames 62 carrying warp ends 52 that will not be forming a portion of the raveling-resistant weave 14, in order to have independent raising and lowering of those sets of harnesses 60 carrying the warp ends 52 forming the raveling-resistant weave 14.

Although there can be many warp ends drawn onto the same harness frame 62, as one looks across the width of the loom 50, each warp end must be drawn through a single heddle eye 58. All of the warp ends drawn on the same harness frame 62 are raised and lowered at the same time and have exactly the same weave pattern. Thus, in order to obtain a different weave pattern, those warp ends that are to have a different weave pattern must be drawn on different harness frames 62, which have a different pattern to their raising and lowering. In order to vary the width and size of either or both of the raveling-prone weave sections 12 or areas of raveling-resistant weave 14, more or less warp ends can be drawn on different harness frames 62 to either increase or decrease the width of each section.

Those portions of raveling-resistant weave 14 running in the fill direction are obtained by the lifting pattern of the harness frames 62. For most common types of weaves, the weave pattern repeats itself every two to eight picks, such that every two to eight picks causes the harnesses 60 to lift in exactly the same pattern. Typically, these types of fabrics are woven on a weaving machine where the harnesses are lifted by cams. However, in the present invention, the repeat unit is of such length that it exceeds the repeat length of repeat units for which cams are available. Cam looms are usually limited to repeat units of a maximum of 16 picks, while the proposed invention requires much longer repeat units, typically on the order of up to several hundred picks. The length of the repeat unit will be governed by the desired length of the finished cut piece.

In order to achieve these long repeat units, it is necessary to use a dobby shedding motion. The dobby can be programed to have a virtually infinite repeat unit length. It would in theory, be possible to weave a fabric with a "raveling prone" and "raveling resistant" section using only cams in a loom. This could be done, for example, by having a "raveling prone" section be made with a satin weave. This section could be surrounded by the "raveling resistant" area, which would be made with a plain weave. This concept would be applicable under the disclosure as it is written by the fact that the plain weave (raveling resistant) area would have many more interlacings of the yarns per unit area than the satin weave (raveling prone) area.

Both of these areas described above, however, would generally be considered as flat fabrics, and not 3-D. But in theory, they could be considered as "raveling resistant" and "raveling prone". Usually cams do not offer a repeat unit of sufficient length in order to construct the detailed and intricate weave patterns of the typical 3-D/honeycomb weaves.

Figure 7:
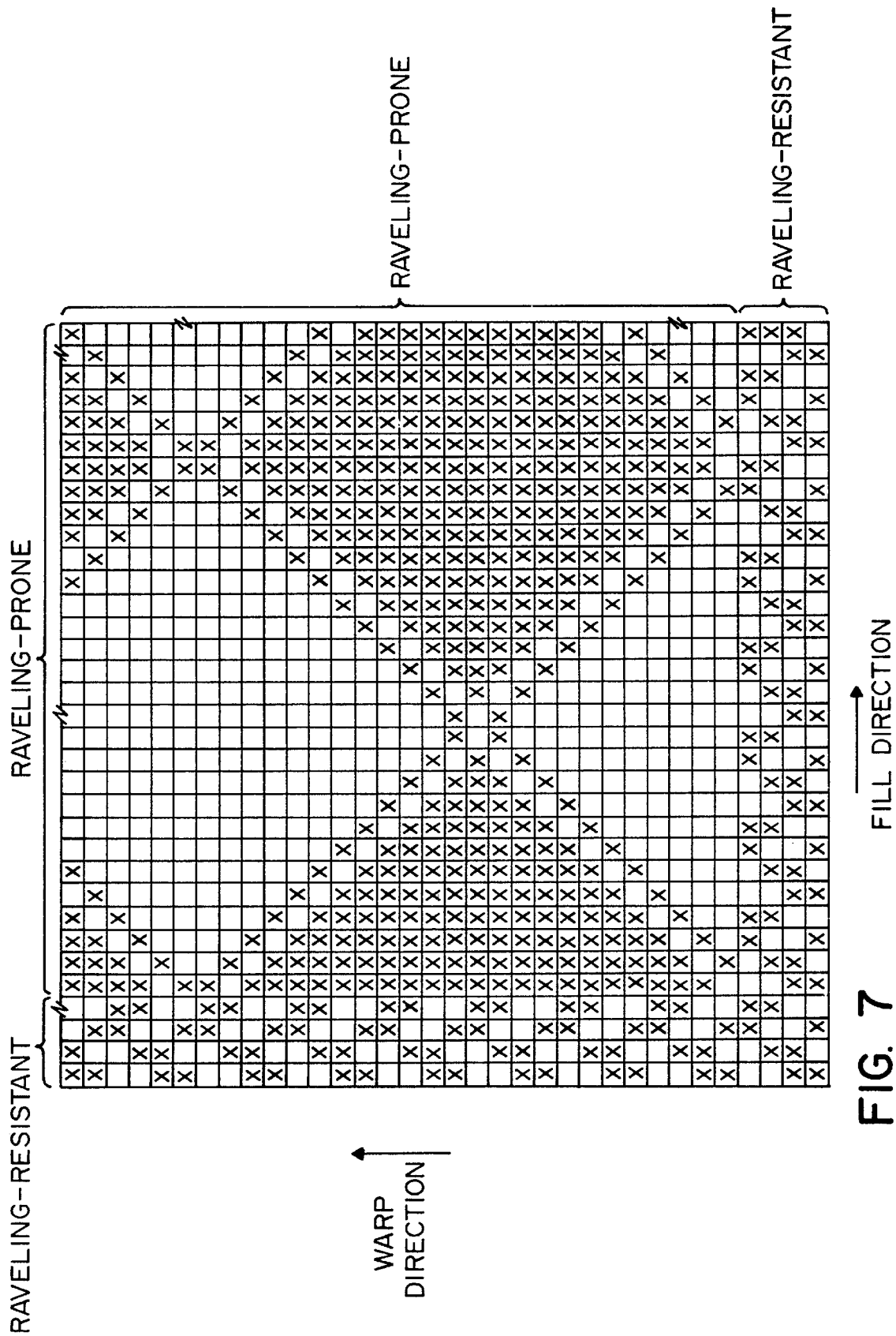
FIG. 7 is an exemplary weave pattern that may be employed to practice the present invention.

A reference was made above to the weave pattern, which controls the raising and lowering of harness frames 62 on loom 50. It is by the design of the weave pattern that the construction of the bands of area of raveling-resistant weave 14 in the fill direction are achieved. To aid in the disclosure of the present method, an exemplary weave pattern providing a raveling-prone weave section 12 and raveling-resistant weave 14 is represented in FIG. 7. The weave pattern mechanically instructs the loom 50 to raise or lower each harness frame 62 as every pick 64 is inserted into the fabric being created.

Particularly, as those of ordinary skill in the art will readily appreciate, the weave pattern is denoted in FIG. 7 by the use of an "X" or a blank in every given square on the pattern. An "X" denotes the harness 62 is in a raised position, which results in the warp end 52 going under the pick 64. A blank denotes a harness 62 is in a lowered position resulting in a warp end 52 going over the pick 64. The weave pattern can be divided into two sections, just like the resultant woven fabric 10. In the raveling-prone weave sections 12, the harness 62 lifting pattern is given along with a value called a "multiplier", which is the number of times the pattern repeats prior to switching to raveling-resistant weave area 14. For example, the longer in length the raveling-prone weave section 12 is required to be, the higher this multiplier value. For a 3-D weave (raveling-prone) the multiplier could be 11, as shown in FIG. 7, or within the general range of from about 1 to about 100. In this way, the size of a given raveling-prone weave section 12 can greatly vary.

The second area of the weave pattern, namely, that provided by raveling-resistant weave 14, contains a standard type of raveling-resistant weave that, according to the proposed invention, is a tighter weave type than that of the raveling-prone weave section 12. The raveling-resistant weave area 12 also contains a multiplier value. Just as with the raveling-prone weave section 12, the length of the raveling-resistant weave area 14 can be increased or decreased by either increasing or decreasing this multiplier value. Multiplier values can range generally from about 1 to about 50, with six being depicted in FIG. 7. The weave pattern determined according to the above perimeters is either manually punched onto a plastic card or programmed into a micro processor and is then programmed into the dobby weaving machine 50.

The raveling-prone weave section 12 or 3-D weave section 12 of the present invention is woven per the prescribed pattern in the dobby. When the desired length of the raveling-prone weave section 12 is achieved, the weave changes to that of the raveling-resistant weave 14 by use of the dobby. That is, the lifting/raising pattern of harness frames 62 changes such that the weave in that area of the fabric being produced changes from raveling-prone weave to raveling-resistant weave.

Conventional dobby weaving machines, such as dobby weaving machine 50, have capacity for generally a maximum of 24 to 30 harness frames 62. As mentioned above, every harness frame can be programmed, through the dobby, to raise and lower in a different pattern. Subsequently, every warp end 52 which is drawn on a particular harness frame 62 weaves into the fabric in exactly the same pattern. Therefore, regardless of the total number of warp ends 52 in the fabric, there can only be a maximum of 24 to 30 (or less, depending on the total number of harness frames 62 on a particular weaving machine) different patterns in which any one of those ends can be woven.

Quite frequently, fabrics produced with very detailed and complex weave patterns, such as those used for home furnishings, linens, upholstery, etc., cannot be produced on these types of weaving machines, having only 24 to 30 harness frames (i.e. "dobby"-type weaving machines). This is due to the detail required to weave the pattern into the fabric. For example, this could include floral prints, fruit, or other images woven into the structure of the fabric. It is well known to those skilled in the art that, when substantial detail is required of a woven fabric, these fabrics must be woven on a weaving machine with a jacquard mechanism as opposed to a dobby.

Figure 8:
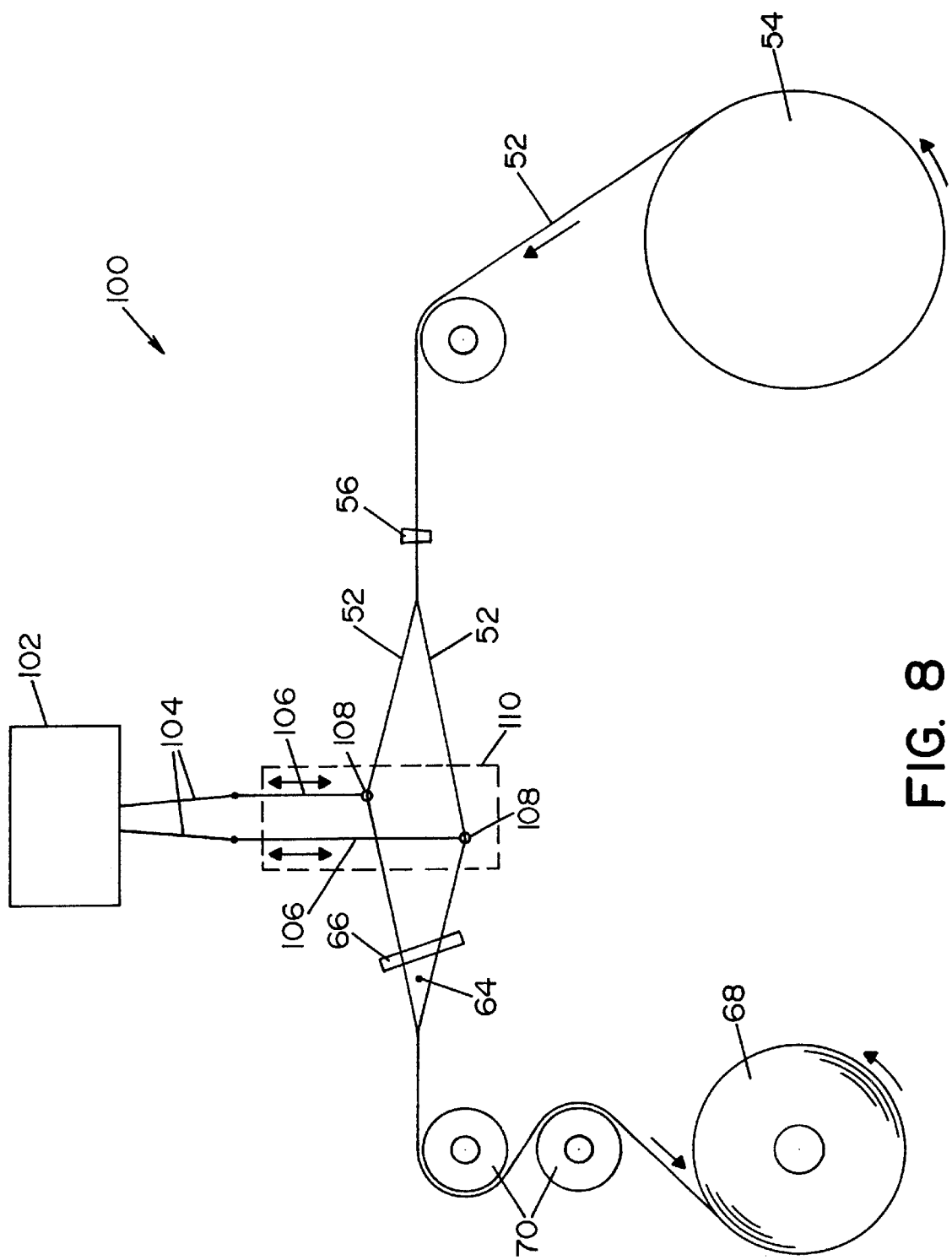
FIG. 8 is a schematic view of another schematic representation of another loom for weaving woven fabric according to the present invention.

Referring now to FIG. 8, a jacquard weaving machine 100 is shown. Jacquard weaving machine 100 is similar to dobby weaving machine 50, but it employs a jacquard device 102. Jacquard device 102 replaces the harness frames 62, to permit every single warp end 52 to be raised and lowered independently of every other warp end 52. Components common to both machines have been numbered the same and have not been described again.

Jacquard device 102 provides lifting chords 104 for each heddle 106. Each warp end 52 is drawn through a heddle eye 108 located on an associated heddle 106. Heddles 106 are held by a heddle frame 110, which serves to guide the raising and lowering of each heddle during the weaving process. As is generally known, each lifting chord 104 is programed through jacquard device 102 to raise and lower in a given pattern to produce the shed of the fabric being created. Therefore, for example, if a warp has 5000 ends, all 5000 ends would be capable of weaving differently. This allows the maximum amount of versatility with which the fabric can be woven, because every single warp end 52 has its own control. This differs from the dobby type of weaving machine 50 described hereinabove, wherein a fabric can have only as many warp ends 52 weaving differently as it has number of harness frames 62.

In order to produce shapes for raveling prone weave section 12, wherein the perimeters are defined by raveling-resistant weave that runs in at least one direction that is not parallel to either the warp or fill direction, usually it is required to have the ability to control the weave pattern of every warp end 52 in the fabric independently of the others (i.e., with a jacquard). For example, if one desires a round shape, in order to accomplish the weaving of the curved edges, it usually requires more than 24 to 30 different "patterns" for weaving the warp ends 52, in order to capture the detail. Generally, only 24 to 30 different weaving patterns for individual warp ends 52 are not sufficient to capture the detail required to create a sufficiently curved shape. Therefore, the dobby weaving machine 50 would not be particularly effective in producing detailed, curved shapes for raveling prone weave section 12 in a woven fabric.

In summary, the method by which a shape other than a rectangle (wherein the raveling-resistant weave runs parallel to both the warp and fill directions) would be constructed with the surrounding raveling-resistant weave is very similar to the method in which intricate and complex patterns are currently produced in woven fabrics for other uses—home furnishings, linens, upholstery, etc. This would require the use of the jacquard device 102 on the weaving machine in order to have independent control of every individual warp end 52 in the fabric. In light of the disclosure herein above, and in light of the general knowledge in the art with respect to such weaving mechanisms, those of ordinary skill in the art will be able to practice the teachings of the present invention.

Thus, it should be evident that the device and methods of the present invention are highly effective in providing a woven fabric composite that includes a raveling-prone weave section, but may be cut at a raveling-resistant weave such that the raveling-prone weave sections do not ravel.

The invention is particularly suited for industrial functions such as filtration and/or separation of solids, liquids, and gases, or as media for collection of moisture from an air stream, but is not necessarily limited thereto. The device and method of the present invention can be used either separately or with other equipment, methods and the like, as well as for the manufacture of other industrial materials.

Based upon the foregoing disclosure, it should now be apparent that the use of the composite woven fabric described herein will carry out the objects set forth hereinabove. It is, therefore, to be understood that any variations evident fall within the scope of the claimed invention and thus, the selection of specific component elements can be determined without departing from the spirit of the invention herein disclosed and described. In particular, raveling-prone weaves according to the present invention are not necessarily limited to those having a 3-D weave pattern, and raveling-resistant weaves are not necessarily limited to those having a plain, twill, or satin weave pattern. Thus, the scope of the invention shall include all modifications and variations that may fall within the scope of the attached claims.

What is claimed is:

1. A woven fabric comprising:
    at least one three dimensional weave section surrounded by flat weave such that said flat weave defines the shape of said at least one three dimensional weave section.

2. A woven fabric according to claim 1, wherein said fabric is woven from a thermoplastic selected from the group consisting of polyethylene, polypropylene, polyester, nylon, and mixtures thereof.

3. A woven fabric according to claim 1, wherein said fabric is woven from warp and fill yarns selected from the group consisting of spun yarns, continuous multi-filament yarns, tape yarns, and monofilament yarns.

4. A woven fabric according to claim 3, wherein said warp yarns and said fill yarns are monofilament yarns.

5. A woven fabric according to claim 1, wherein said flat weave has a yarn density of about 20 to about 100 ends/inch.

6. A woven fabric according to claim 1, wherein said flat weave is a plain weave, satin weave, or twill weave section.

7. A method for creating a woven fabric having a plurality of three dimensional weave sections, each surrounded by a perimeter of flat weave, comprising:
    programming a desired weave pattern into a dobby to weave said three dimensional weave sections of the fabric in a prescribed pattern and change the weave to that of the flat weave when the desired length of said three dimensional weave sections is reached;
    drawing warp ends corresponding to said three dimensional weave sections on harness frames separate from those harness frames associated with warp ends of said three dimensional weave sections can be independently raised or lowered by their associated harness frames;
    weaving fabric according to the prescribed pattern in the dobby; and
    providing flat weave in the warp direction by independently raising and lowering warp ends associated with said flat weave.

8. A method according to claim 7, wherein said fabric is woven from a thermoplastic selected from the group consisting of polyethylene, polypropylene, polyester, nylon, and mixtures thereof.

9. A method according to claim 7, wherein said fabric is woven from warp and fill yarns selected from the group consisting of spun yarns, continuous multi-filament yarns, tape yarns, and monofilament yarns.

10. A method according to claim 9, wherein said warp yarns and said fill yarns are monofilament yarns.

11. A method according to claim 7, wherein said flat weave is a plain weave, satin weave, or twill weave section.

12. A method for creating a woven fabric having a plurality of three dimensional weave sections, each surrounded by a perimeter of flat weave, comprising:
    programming a desired weave pattern into a jacquard device to weave said three dimensional weave sections of the fabric in a prescribed pattern and change the weave to that of said flat weave when the desired length of said three dimensional weave sections is reached.

13. A method according to claim 12, wherein said fabric is woven from a thermoplastic selected from the group consisting of polyethylene, polypropylene, polyester, nylon, and mixtures thereof.

14. A method according to claim 12, wherein said fabric is woven from warp and fill yarns selected from the group consisting of spun yarns, continuous multi-filament yarns, tape yarns, and monofilament yarns.

15. A method according to claim 14, wherein said warp yarns and said fill yarns are monofilament yarns.

16. A method according to claim 12, wherein said three dimensional weave is a plain weave, satin weave, or twill weave section.

17. A filter element comprising:
    a frame member; and
    a woven fabric providing at least said three dimensional weave section surrounded by flat weave such that said flat weave defines the shape of said at least three dimensional weave section.

18. A filter element according to claim 17, wherein said fabric is woven from a thermoplastic selected from the group consisting of polyethylene, polypropylene, polyester, nylon, and mixtures thereof.

19. A filter element according to claim 17, wherein said fabric is woven from warp and fill yarns selected from the group consisting of spun yarns, continuous multi-filament yarns, tape yarns, and monofilament yarns.

20. A filter element according to claim 19, wherein said warp yarns and said fill yarns are monofilament yarns.

21. A filter element according to claim 17, wherein said flat weave has a yarn density of about 20 to about 100 ends/inch.

22. A filter element according to claim 17, wherein said flat weave is a plain weave, satin weave, or twill weave section.

* * * * *